(12) United States Patent
Meinander

(10) Patent No.: US 7,947,122 B2
(45) Date of Patent: May 24, 2011

(54) METHOD AND AN ARRANGEMENT FOR IMPROVING GAS REMOVAL

(75) Inventor: Paul Olof Meinander, Grankulla (FI)

(73) Assignee: Pom Technology Oy AB, Helsinki (FI)

( * ) Notice: Subject to any disclaimer, the term of this patent is extended or adjusted under 35 U.S.C. 154(b) by 695 days.

(21) Appl. No.: 11/577,477

(22) PCT Filed: Oct. 18, 2005

(86) PCT No.: PCT/FI2005/050360
§ 371 (c)(1),
(2), (4) Date: Mar. 10, 2008

(87) PCT Pub. No.: WO2006/042906
PCT Pub. Date: Apr. 27, 2006

(65) Prior Publication Data
US 2009/0038475 A1   Feb. 12, 2009

(30) Foreign Application Priority Data
Oct. 19, 2004   (FI) .................................... 20041353

(51) Int. Cl.
*B01D 19/00* (2006.01)
*C02F 1/20* (2006.01)
(52) U.S. Cl. ........................................... 95/261; 96/212
(58) Field of Classification Search .................... 95/261; 96/209, 210, 211, 212
See application file for complete search history.

(56) References Cited

U.S. PATENT DOCUMENTS 3,359,708 A * 12/1967 Barber ............................ 96/167

(Continued)

FOREIGN PATENT DOCUMENTS

GB           2007118 A     11/1978

(Continued)

OTHER PUBLICATIONS

English translation of the Office Action issued in the corresponding Japanese Patent Application No. 2007-537317 mailed on Jul. 13, 2010.

*Primary Examiner* — Duane Smith
*Assistant Examiner* — Douglas J Theisen
(74) *Attorney, Agent, or Firm* — Browdy and Neimark, PLLC

(57) ABSTRACT

The present invention relates to a method for improving the efficiency of gas removal wherein gas-enriched process liquid (2) is introduced tangentially into a vertical essentially cylindrical vessel (1) and thereafter removed at the bottom of the vessel. By means of centrifugal force gas (2*d*) is brought to enrich in a part (2*a*, 2*b*) of the liquid (2). This part (2*a*) of liquid (2) having an enriched gas content (2*c*) is redirected to at least one vertical means (7) arranged centrally in the vessel (1), and separately removed therefrom. The present invention also relates to a de-gassing arrangement in an arrangement including at least one vertical essentially cylindrical vessel (1). Said vessel (1) includes at least one tangentially arranged inlet (4) for gas-enriched liquid and at least one discharge (6) for de-gassed liquid, which discharge is arranged at the lower portion of the vessel (1). The vessel (1) includes centrally arranged vertical means (7) having one or several inlets (8) for gas-enriched liquid (2*a*). Said vertical means (7) include one or several separate discharges for this portion of the liquid (2*a*), portions thereof (2*b*) and/or gas (2*c*, 2*d*).

5 Claims, 2 Drawing Sheets

U.S. PATENT DOCUMENTS

| | | | | |
|---|---|---|---|---|
| 3,771,290 A | * | 11/1973 | Stethem | 96/210 |
| 5,203,891 A | | 4/1993 | Lema | |
| 5,622,545 A | | 4/1997 | Mazzei | |
| 7,691,184 B2 | * | 4/2010 | Meinander | 95/261 |
| 2004/0144256 A1 | | 7/2004 | Mazzei | |

FOREIGN PATENT DOCUMENTS

| | | |
|---|---|---|
| JP | 4694332 | 10/1971 |
| JP | 03-065259 | 3/1991 |
| JP | 2003-080005 | 3/2003 |
| SU | 1344386 A1 | 8/2007 |

* cited by examiner

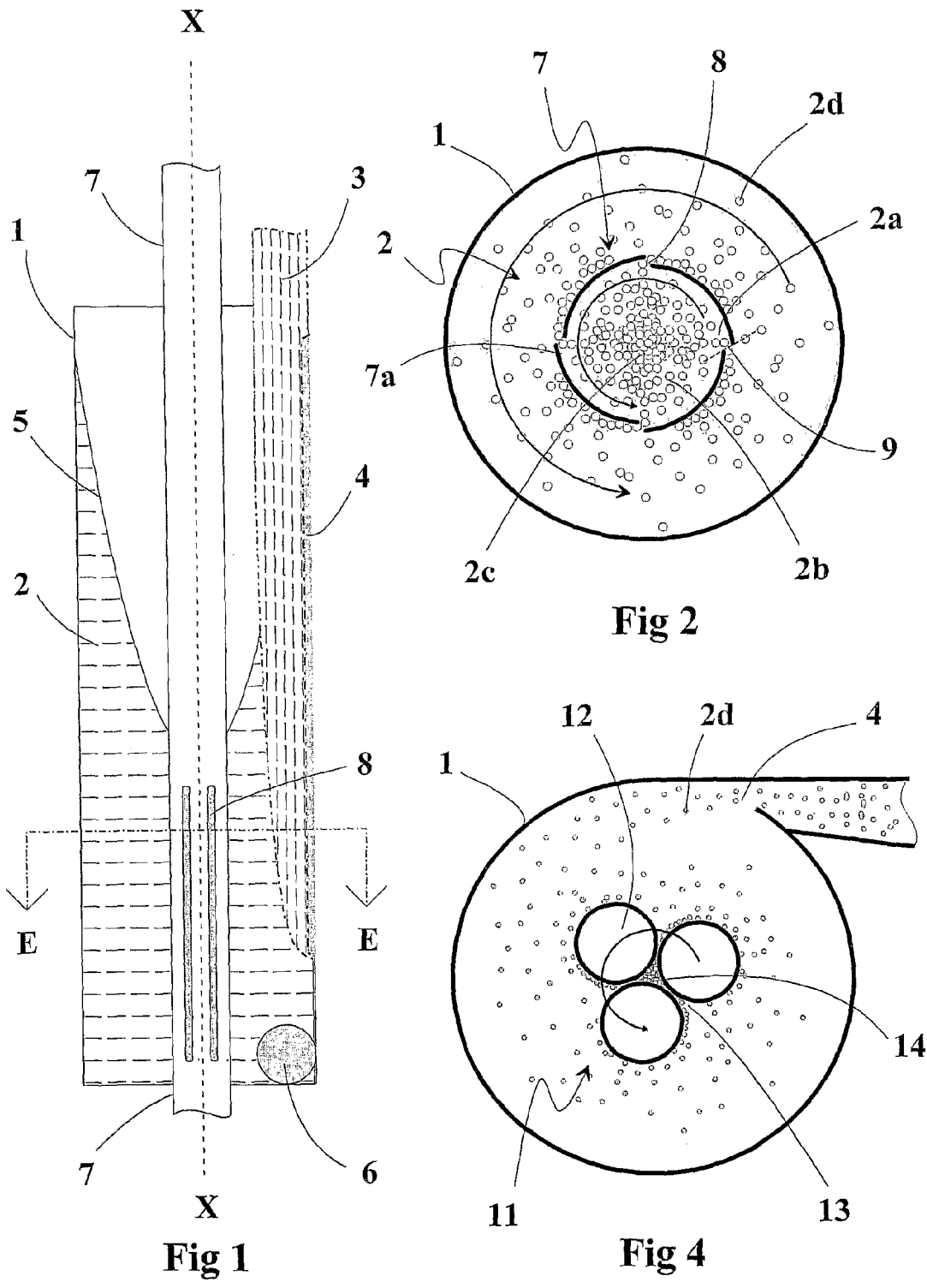

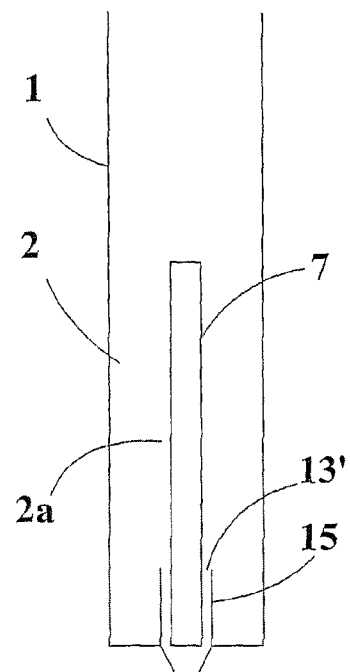
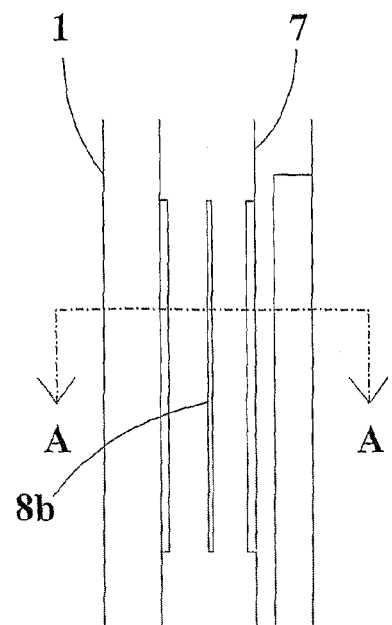
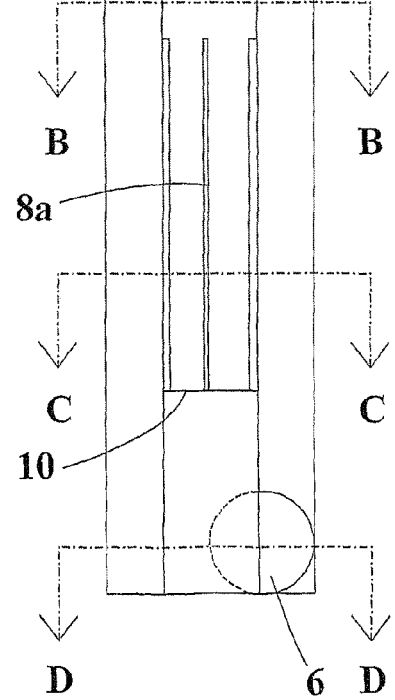
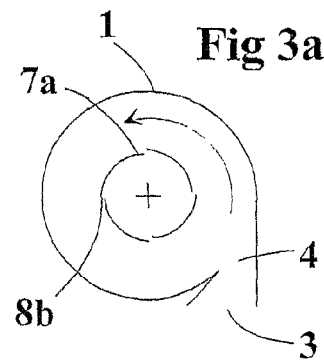
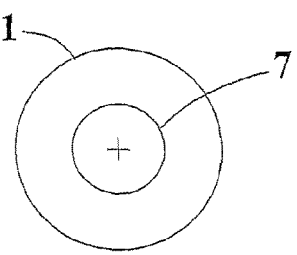
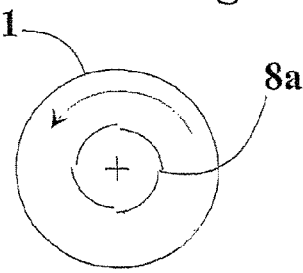
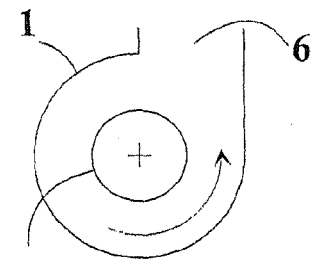
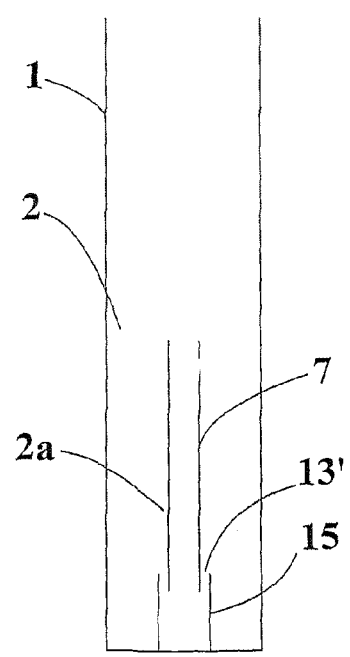

METHOD AND AN ARRANGEMENT FOR IMPROVING GAS REMOVAL

The present invention relates to a method, in accordance with the preamble of claim 1, for improving the efficiency of de-gassing in a vessel where a liquid containing gas is introduced into a vertically essentially cylindric vessel in a tangential direction along the vessel's wall and further on removed at a bottom of the vessel, while gas is made to escape. The present invention also relates to an arrangement in accordance with the preamble of claim 4, especially to an arrangement in connection with de-gassing in an arrangement including a vertical essentially cylindrical vessel including one or several inlets for a liquid containing gas, which inlets are tangentially arranged in relation to an inner surface of the vessel in such a way that said liquid containing gas is brought to a rotation, as well as at least one outlet for de-gassed liquid arranged at a lower portion of the vessel.

In the applicant's earlier Finnish patent application No 20030627 is disclosed a method and an arrangement for improving gas removal especially in liquids comprising air. The present application relates to an improvement of said method and said arrangement in certain contexts, and the disclosure of said patent application is hereby included as a part of the present application.

In general said patent application discusses a vertical cylindrical vessel wherein a gas-enriched liquid is brought to move in the shape of a sharply delimited jet at a high initial speed along a wall of the vessel. A whirl will then arise in the vessel, and due to the impact of centrifugal forces gas will emerge at the curved surface of said whirl, after which de-gassed liquid exits through an outlet which is arranged below the surface of the liquid. The arrangement will be used especially at air removal from process water at the production of paper or cellulose.

Normally the vessel can be dimensioned so that the speed of the liquid in an axial direction is lower than the rising speed of the gas. In certain cases such a dimensioning cannot be applied and then problems arise since the separation of gas will be impeded by the liquid flow. By utilizing the present invention such problems can be avoided and thus the functional range of the arrangement can be enlarged, in certain cases even so much that the gas separation at the curved liquid surface will be of secondary importance. This is achieved in accordance with what is disclosed in the characterizing portion of the appended independent claims.

The present invention is based on the unexpected insight that certain physical properties can be utilized in quite different ways in an arrangement according to the earlier patent application. Thus use is made of the fact that gas in liquid located in the center of the whirl mass, for example at a vortex finder or a central tube, under impact of centrifugal forces in practice will be enriched within a relatively limited partial volume. This limited partial volume can be defined as a second separating stage where a dynamic circulation takes place. Thus, 90 to 99% of all air will gather in a partial volume of about 10% of the total amount of water, and the air content in this partial volume can be as much as 10 to 20% by volume or more. By using special means for removing expressly this partial volume the amount of air striving up against the current can be drastically reduced in relation to the liquid entering into the vessel for de-gassing.

Thus, the present invention is characterized as defined in the appended independent claims while the dependent claims disclose certain favorable embodiment. Thus, the method according to the present invention is characterized in that gas is brought to enrich, under the impact of the centrifugal force, in a part of the liquid and this part of the liquid having an enriched gas content is redirected to a vertical means which is arranged centrally in the vessel, after which this deflected portion of the liquid is drawn off. The arrangement according to the present invention is characterized in that the vessel includes centrally arranged means having one or several inlets for gas-enriched liquid, as well as one or several separate outlets for this part of the liquid and, respectively, gas, wherein said outlets are arranged at said vertical means.

Below some embodiments of the present invention will be described in more detail as examples and by reference to the appended drawings, wherein;

FIG. 1 generally discloses how an arrangement according to the present invention connects to an arrangement as defined in said earlier application, FIG. 2 in section discloses how a central tube having slits will collect gas-enriched liquid to be removed, as such, for further treatment or to a corresponding second step in the process, FIG. 3 in section discloses an arrangement essentially in accordance with FIG. 2, wherein the partial FIGS. 3A, 3B, 3C and 3D show that the central tube can vary depending on the axial position, FIG. 4 in section from above discloses an alternative embodiment, and FIGS. 5A and 5B show some alternative embodiments.

In general, an arrangement according to the earlier patent application includes a vessel 1 to which liquid 2 having a gas content is introduced through an inlet 3 including a slit 4 which extends tangentially along the wall of the vessel. Since the liquid is introduced tangentially along said wall it is forced into rotation so that a whirl 5 is formed in the vessel 1, at the surface of which whirl gas can discharge and be drained off the vessel. An outlet 6 is arranged in the lower portion of the vessel 1 and thus an essentially stable flow through the vessel 1 can be maintained.

However, due to the rotational movement the centrifugal force will bring about a separation within the liquid 2 so that liquid having a lower gas content will draw to the walls of the vessel 1, while the lighter gases will gather in that part 2a of the liquid which is located closer to a central axis X-X of the vessel 1. According to the present invention a separate arrangement is now arranged at or around this central axis X-X in order to provide a possibility for the gas this way enriched to be deflected at one or several levels which are located below the curved liquid surface of the whirl 5. In FIG. 1 such an arrangement is roughly indicated in the shape of a central tube 7 including openings, for example essentially vertical slits 8 through which the highly gas-enriched part 2a of the liquid can escape into the central tube 7 where a centrifugation can continue.

FIG. 2 discloses a section of a favorable arrangement at a level corresponding to E-E in FIG. 1, wherein the liquid 2 in the vessel 1 has a gas content which in the Figure schematically has been indicated as bubbles 2d. In this section said central tube 7 is suitably cut open so that tube segments 7a which are slightly turned or bent outwards from an initial position constitute nozzles or blades having openings 8 which favorably are delimited in such a way that a front surface 9 of said openings 8 will open towards the liquid stream, favorably so that said front surface is at least slightly in an angle in relation to the radius of said tube 7, whereby the liquid 2a which enters into said tube 7 through said openings 8 and which is highly enriched with gas 2d will continue to rotate. In the center of the tube 7 will then gather the most gas-enriched part 2b of the liquid 2a, in some cases even a more or less pure gas column 2c.

The gas-containing liquid 2a, 2b can be drawn off by diverting, at the bottom of said central tube 7, a liquid stream suitably corresponding to 5 to 20% of the whole amount of liquid. At the same time more or less the whole gas content will be diverted. Alternatively, the liquid 2a, 2b and, respectively, the gas column 2c can be brought to move upwards in said tube 7 by means of the buoyancy of the gas 2d in the liquid and/or under impact of a vacuum which can be obtained by external means or by means of ejector nozzles or a slit arrangement at the upper end of said tube 7 (see also FIG. 3).

FIG. 3 as well as the partial FIGS. 3a, 3b, 3c and 3d disclose a favorable embodiment of the above generally described arrangement in more detail. The arrangement includes a tube having a generally circular cross section and a diameter of 2 to 4 times, in the shown embodiment suitably about 3 times the diameter of the central tube 7. In this arrangement the upper surface of the whirl 5 (not shown in FIG. 3) is of none or a very minor importance for the de-gassing. Instead, the central tube is provided with favorably slit-like inlet openings 8a, whereby, in practice, an essential portion of the gases will be deviated through the central tube 7. In order to increase the functional efficiency the central tube 7 is suitably provided with a number of further openings or slits 8b above the inlet openings 8a, and these slits 8b are adjusted so that the liquid stream around the outer side of said tube 7 will bring about an ejector effect within the upper portion of said tube 7. In order to avoid that the current through the outlet 6 interferes with the inlets 8a to the tube 7 the tube 7 can favorably be delimited at its lower part by means of an intermediate bottom 10. FIGS. 3a, 3b, 3c and 3d taken at respective sections A-A, B-B, C-C and D-D disclose in more detail the structure of the arrangement.

FIG. 4, again, schematically discloses a special embodiment of the present invention. This embodiment includes a rotating vortex finder 11 which suitably is located centrally in the vessel 1 and can be freely driven by the liquid current or arranged so that it at least partially is driven by external means. In the embodiment disclosed in FIG. 4 this rotating vortex finder includes a bundle of tubes 12 having a circular cross section or tube sections (not shown) comprising curved envelope surfaces. This curvature of the envelope surfaces increase the centrifugal impact in the liquid and causes gas or gaseous water to efficiently be forwarded towards a slit 13 between the tubes 12 and into a channel 14 which is formed at the center around the rotational axis.

Finally, FIGS. 5a and 5b disclose, in the form of principle sketches, another arrangement for diverting the gas-enriched portion 2a of the liquid 2. This arrangement includes a concentric collar 15 which is arranged around the lower end of the tube 7. The gaseous liquid is brought in into the intervening space 13' between said collar 15 and the tube 7, after which it can be forwarded through an air outlet 16 or back upwards by means of a chimney effect of the tube 7 or ejectors (not shown) at the upper end of the tube 7.

The present invention can be used within several fields in the industry. As mentioned before paper and cellulose industry constitutes a central field of application. Besides the examples indicated in the earlier patent application FI-20030627 it can be stated that for example back water drained from a paper machine comprises large contents of air. In order to remove so much air that the water can be pumped in conventional centrifugal pumps the water is forwarded to back water tanks where the bubbles of air can rise to the water surface and be drained off. In order to make this happen the tanks are generally dimensioned so that the vertical speed of the water current should be less than 0.15 meters/second, preferably less than 10 meters/second. Thus the tanks will be very large, which, besides taking up space, also facilitate a large scale turbulence which can cause variations in consistency and air content which disturb the process. An alternative solution which has been used lately is to forward the water along channels having a large open surface. Such channels occupy lots of space, up to hundred square meters or more.

The present invention provides an equally or more efficient de-aeration than these traditional solutions and this on a floor space which is about a tenth of the space needed for a back water tank, or one fiftieth or hundredth of a de-aerating channel.

Above some favorable embodiments and uses for the present invention have been disclosed, but for the professional it is clear that the present invention also can be implemented in many other ways within the scope of the appended claims.

The invention claimed is:

1. A method for improving the efficiency of gas removal in a vessel where a process liquid containing a gas is introduced into a vertical essentially cylindrical vessel tangentially along a wall of the vessel so that said liquid is brought into rotation and further removed at a bottom of said vessel, bringing, by means of centrifugal forces, the gas to be enriched in a portion of said liquid, redirecting this liquid portion having an enriched gas content to at least one vertical means arranged centrally in said vessel, and separately removing said redirected portion of said liquid, and said gas enriched portion of liquid is deviated into a central tube through at least one opening which is arranged within said tube or in connection therewith, and the liquid is redirected at an upper end of said tube, suitably by means of a buoyancy force of the enriched gas, by means of an ejector arrangement or by means of a vacuum arranged in said tube.

2. A method as defined in claim 1, wherein the liquid is redirected at a lower end of said tube, suitably so that the redirected gas/liquid volume constitutes 5 to 20% of the whole amount of process liquid.

3. A method as defined in claim 1, wherein using a rotating or rotatable central means, suitably a multitude of vertical tubes or tube segments in a parallel arrangement, whereafter the gas in a space between said tubes or tube segment is further enriched by means of centrifugal force.

4. A de-gassing arrangement in an arrangement including a vertical essentially cylindrical vessel including one or several inlet(s) for a liquid containing a gas, which inlets are arranged tangentially in relation to an inner surface of said vessel so that said liquid containing gas is brought into rotation, as well as at least one outlet for de-gassed liquid arranged at a lower portion of said vessel, wherein said vessel includes centrally arranged vertical means having one or several inlets for liquid having an enriched gas content, and one or several separate outlets arranged at said vertical means for this portion of liquid, parts thereof and/or gas, wherein said inlets for said vertical means include holes, nozzles or vertical slits, and wherein said inlets for said vertical means include a concentric collar arrangement which is arranged at a lower portion of said vertical means so that between a collar and said vertical means at least one essentially circular slit is formed which leads to an inner portion of said essentially vertical means.

5. A de-gassing arrangement in an arrangement including a vertical essentially cylindrical vessel including one or several inlet(s) for a liquid containing a gas, which inlets are arranged tangentially in relation to an inner surface of said vessel so that said liquid containing gas is brought into rotation, as well as at least one outlet for de-gassed liquid arranged at a lower portion of said vessel,
 wherein said vessel includes centrally arranged vertical means having one or several inlets for liquid having an enriched gas content, and one or several separate outlets arranged at said vertical means for this portion of liquid, parts of thereof or gas, and
 wherein said vertical means include a multitude of tubes or tube segments arranged to rotate or be rotated in relation to said vessel, suitably so that between said tubes or said tube segments slits is formed and, respectively, at least one central channel for gas enriched liquid.

* * * * *